United States Patent [19]
Forde

[11] Patent Number: 5,141,644
[45] Date of Patent: Aug. 25, 1992

[54] BUOYED FLAPPER VALVE

[75] Inventor: Ralph M. Forde, Richmond, Calif.

[73] Assignee: Chevron Research & Technology Company, San Francisco, Calif.

[21] Appl. No.: 575,333

[22] Filed: Aug. 30, 1990

[51] Int. Cl.⁵ .................. B01D 21/26; F16K 31/18
[52] U.S. Cl. .................. 210/512.1; 210/512.2; 55/459.1; 209/144; 209/211; 137/424; 137/435; 137/448
[58] Field of Search .................. 210/338, 512.1, 512.2; 55/459.1; 204/144, 211; 137/424, 435, 448

[56] References Cited

U.S. PATENT DOCUMENTS

| | | | |
|---|---|---|---|
| 1,349,267 | 8/1920 | Craig | 137/435 |
| 1,457,314 | 6/1923 | Mueller | 137/435 |
| 4,055,486 | 10/1977 | Choi et al. | 209/144 |
| 4,702,271 | 10/1987 | Giehl | 137/448 |

Primary Examiner—Robert A. Dawson
Assistant Examiner—David Reifsnhder
Attorney, Agent, or Firm—Burns, Doane, Swecker & Mathis

[57] ABSTRACT

A buoyed flapper valve comprises a flapper which is capable of closing an exit of a dipleg or standpipe, which is also connected to a counterweight and a float. The float has sufficient buoyancy to as to overcome the weight of the counterweight when the valve is submerged in a bed of particulate material. The flapper valve is preferably employed as a dipleg check valve within a reactor, e.g., a riser reactor system, and can be used under a variety of operating conditions including both submerged and non-submerged operating conditions.

15 Claims, 3 Drawing Sheets

BUOYED FLAPPER VALVE

BACKGROUND OF THE INVENTION

The present invention relates to an improved cyclone dipleg check valve which is capable of improving the operation of the dipleg under a variety of operating conditions.

In a cyclone separator, a suspension comprising a gasiform material with entrained finely divided solid material is introduced into the separator in a tangential manner that imparts a spiral or centrifugal swirling motion or action to the suspension. The centrifugal action causes the solids to be thrown to the outer wall of the cyclone separator and they then exit the separator via a standpipe or dipleg means. These cyclones are particularly useful in connection with organic reactions employing fluidizable catalytic particles, such as the catalytic treatment of petroleum fractions by cracking, the synthesis of hydrocarbons from carbon monoxide and hydrogen, the conversion of methanol to liquid hydrocarbons or other fluid catalyst operations known in the art.

In these operations, such as, for example, riser catalytic cracking operations, enormous amounts of solid catalyst particles suspended in gasiform materials are handled in riser catalytic cracking units and it is necessary to rapidly separate the suspensions into a catalyst phase and a gasiform phase after the suspension from the conversion operation has traversed the riser unit or the conversion zone. The dipleg or standpipe means of the cyclone separator is usually equipped with a valve means which allows the accumulated solid catalyst particles to be discharged into the space below the dipleg once the weight of the accumulated particles in the dipleg reaches a predetermined limit. The valve means may sometimes be equipped with a counterweight to regulate the weight of the solid particles necessary to open the valve means.

The most common types of valve used for that purpose are trickle valves, flapper valves and flapper valves with a counterweight, the weight of which may be adjusted for a particular application. These are well known in the art as shown and discussed in, e.g., Zenz and Othmer, "Fluidization in Fluid Particle Systems," Rheinhold Publishing Corp., 1960, pages 410-415.

In an operation involving heavily loaded cyclones, such as riser cyclones or primary cyclones, the flapper valve may stay open permanently at normal operating conditions; however, the degree of opening of the valve must be restricted by the counterweight, so that an inventory of catalyst is retained inside the dipleg.

With lightly loaded cyclones, such as secondary cyclones, the flapper valve needs to open and close intermittently in order to prevent the aforementioned undesirable flow of gaseous reactants in the dipleg. This flow of gas, in the case of riser cyclones, is downwards and can affect reaction selectivity and reactor vessel entrainment. In the case of primary or secondary cyclones, the gaseous flow in the dipleg is upwards; it can seriously interfere with the operational efficiency of the separator and may even prevent its satisfactory operation.

It is also known in the art that under certain operating conditions, the lower end of the flapper valve may be submerged into the catalyst bed which is present within the reaction vessel. In such a "submerged" operation, it is preferred that the flapper valve remain opened because even partial closure of the valve would restrict the flow of solids from the dipleg. However, the freedom of motion of the flapper valve is restricted by the surrounding catalyst fluid bed, and so there is always a potential for failure to open, or to open sufficiently. This will cause catalyst to fill the dipleg completely, and to back up into the cyclone, leading to excessive catalyst carryover.

Furthermore, during start-up of the submerged operations, the catalyst bed is usually too low to seal the diplegs for a long period of time, due to a low catalyst inventory. Consequently, a large amount of catalyst is often lost through unsatisfactory separator operation. Moreover, this lost catalyst has been known to cause serious problems, such as air pollution and fouling of downstream product recovery equipment.

Trickle valves may be employed under such circumstances: however, they leak and so they do not seal effectively. Furthermore, the freedom of motion of a trickle valve may be restricted by the surrounding catalyst fluid bed, leading to complete filling of the dipleg and excessive catalyst carryover.

Thus, the need still exists for a flapper valve which can effectively work under a variety of operating conditions, including both submerged and non-submerged operation.

Accordingly, it is an object of the present invention to provide such a flapper valve.

SUMMARY OF THE INVENTION

In accordance with the foregoing objectives, the present invention relates to an improved flapper valve which can be employed as a dipleg check valve. This flapper valve comprises a flapper means which is capable of closing an exit of a dipleg or a standpipe, a counterweight means, a float means, and means for connecting flapper means with the counterweight means and the float means. The float means employed in the present invention has sufficient buoyancy to overcome the weight of the counterweight means when the valve is submerged in a fluidized bed of particulate material.

In another aspect, the present invention relates to the use of the improved flapper valve as a dipleg check valve means in a vessel, e.g., a riser reactor vessel.

DETAILED DESCRIPTION OF THE PREFERRED EMBODIMENTS

The present invention relates to a flapper valve which can be employed in an environment, e.g., a riser reactor system, operating under various operating conditions, e.g., submerged and non-submerged operations. The flapper valve according to the present invention includes both a counterweight and a float.

The present invention can effectively employ any flapper valve which includes a counterweight. Such flapper valves are known in the art and need not be further described here.

The float means which can be employed in the present invention includes any float with sufficient buoyancy to overcome the weight of the counterweight when the flapper valve is submerged in a fluidized bed of particulate material, e.g., catalytic material. Accordingly, the buoyancy is dependent upon the particular application.

The float, for example, can be a gas-filled cylinder or a gas-filled sphere as illustrated in FIGS. 1–8.

The size and shape of the float is not critical as long as it meets the buoyancy requirements discussed above. Typically, in riser reactor operations, where the dipleg has, for example, a ten inch diameter, the use of a gas filled cylinder or sphere having an eight to ten inch diameter is typical.

Similarly, the material of construction associated with the float is not critical as long as the float does not become damaged or explode during normal operations. For example in a riser reactor operation, a steel or steel alloy having a ⅛ to 1/16 inch thickness can be effectively employed for the production of the float.

In designing the flapper valve according to the present invention, it should be remembered that the weight of the float effectively adds to the counterweight when the flapper valve is employed under non-submerged conditions.

The float is employed in a such a manner such that it is capable of overcoming the weight of the counterweight when it is "submerged" in a fluidized bed of particulate material. In a preferred embodiment, an arm means connects the flapper valve with the counterweight and the float. See, for example, FIGS. 1–8.

However, the exact structure, e.g., shape, of the arm means is not critical to the present invention as long as it allows the flapper valve to swing freely, i.e., open and close without sticking.

Figure 1:
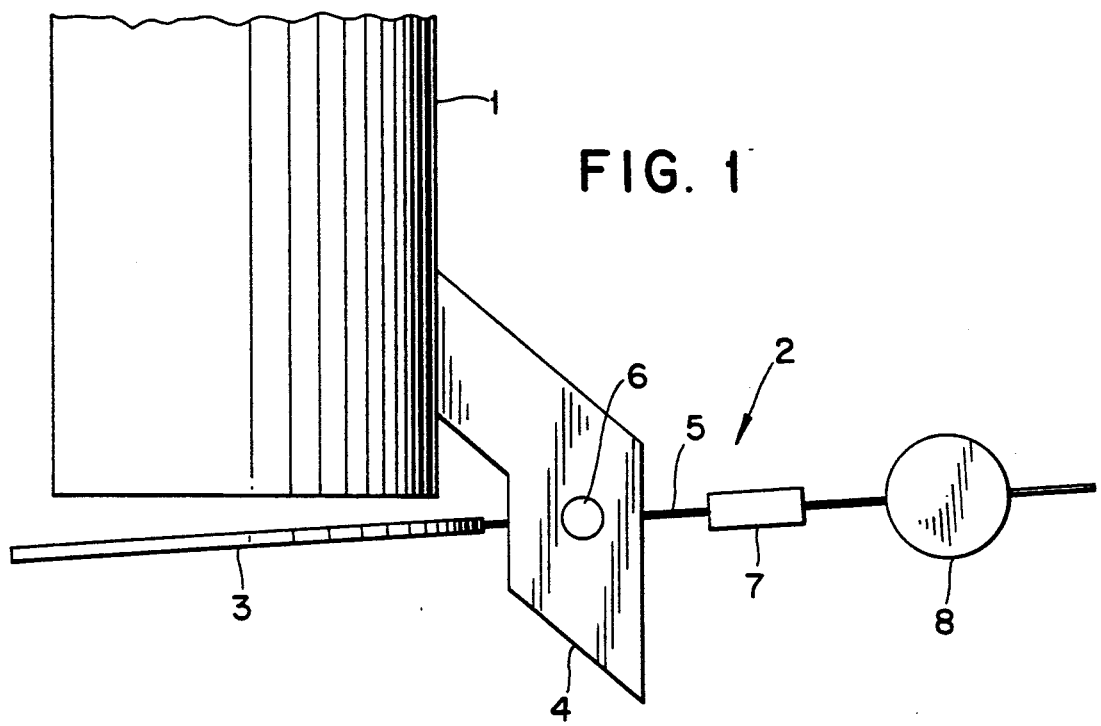
FIG. 1 illustrates a flapper valve according to the present invention.

With reference to FIG. 1, a standpipe or dipleg 1 (the terminal exit end thereof is shown in the figures) is provided. The exit of the standpipe is equipped with a flapper valve 2, comprising a plate or disc 3, attached to a support means 4 which is attached to an arm means 5 at a pivot point 6. The arm means 5 is pivoted at the pivot point 6. The arm means has also attached thereto a counterweight 7 and a float 8.

The flapper valve according to the present invention can be employed in any environment where the control of flow of materials, e.g., solid particulate material is desired. A preferred environment is as a check valve for a dipleg in, e.g., a riser reactor system.

It can be employed in those riser reactor systems known in the art, for example, a reactor vessel having at least the upper end of a riser reactor and at least one separator, e.g., cyclone separator, located therein. Furthermore, the flapper valve can be employed in connection with any or all of the riser cyclone, primary cyclone or secondary cyclone.

Figure 2:
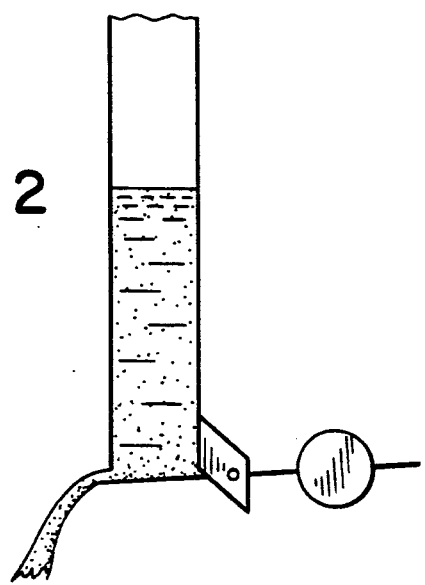
FIG. 2 illustrates the use of the flapper valve in a non-submerged operation.

When the flapper valve is employed as a dipleg check valve under non-submerged operating conditions, the counterweight serves the same function as it does in conventional check valves, i.e., as illustrated in FIG. 2. These counterweights are the same as those typically employed in the art, e.g., washers of specific weights.

As shown in FIG. 2, once the weight of the solids in the dipleg exceeds that of the counterweight, the plate swings open and allows the solids to exit. After a substantial amount of the solids exits the standpipe, the weight of the solids exerting pressure on the plate is less than the weight of the counterweight, the plate moves upwardly to the closed position.

Figure 3:
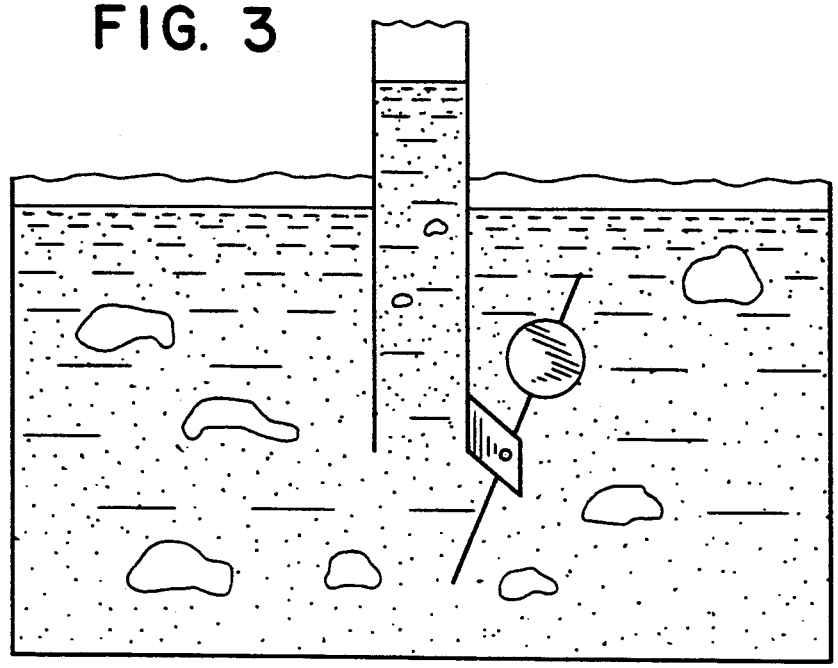
FIG. 3 illustrates the use of the flapper valve in a submerged operation.

When the flapper valve is employed under submerged operating conditions, e.g., that illustrated in FIG. 3, the float has sufficient buoyancy such that the plate remains substantially open throughout the operation.

Figure 4:
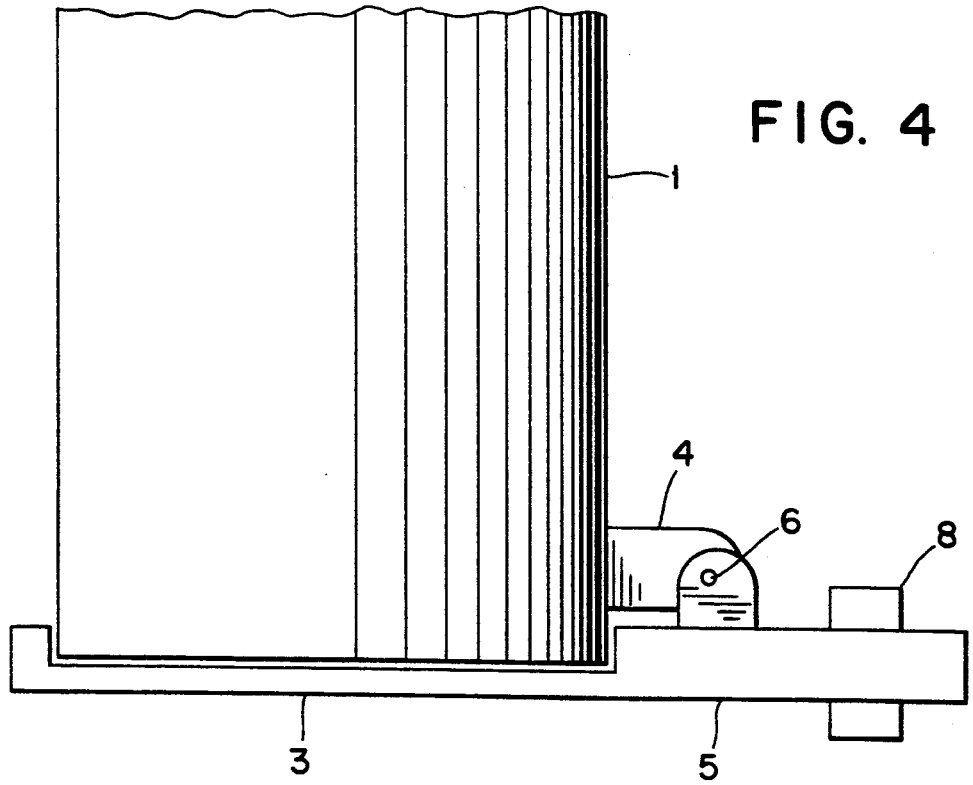
FIGS. 4-8 illustrate other embodiments of flapper valves according to the present invention.
Figure 5:
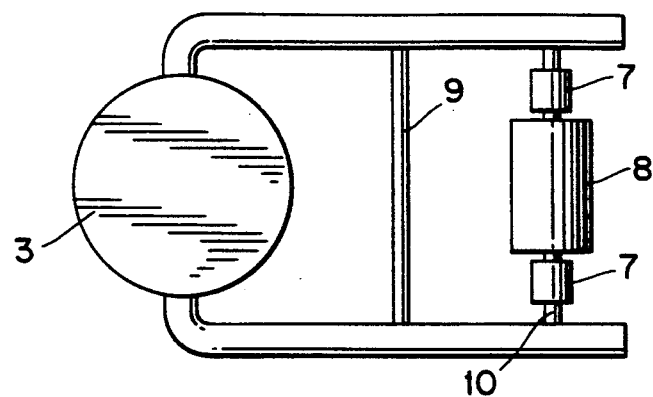
Figure 6:
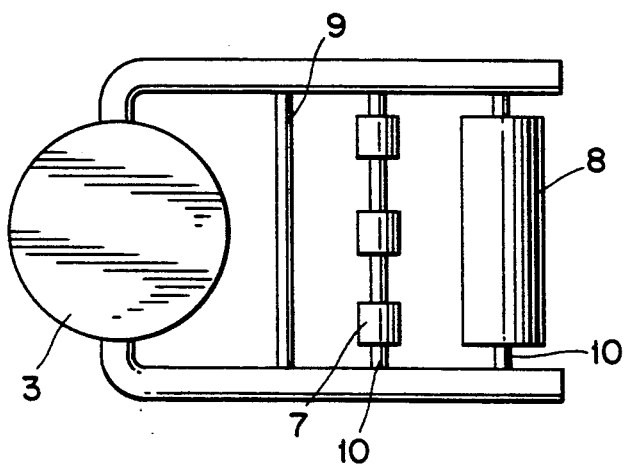
Figure 7:
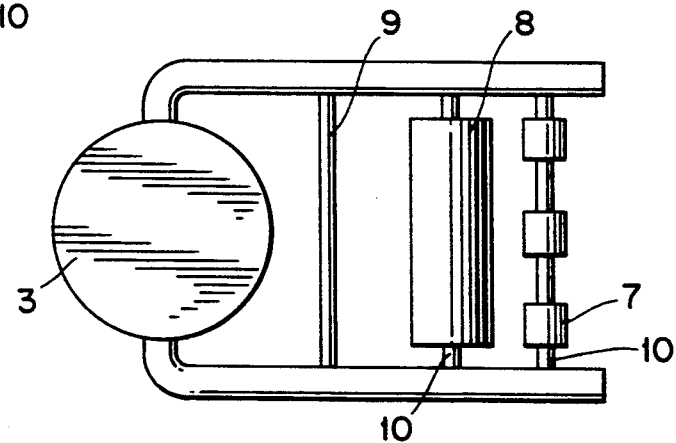

Another embodiment of the present invention is illustrated by FIG. 4 which employs the same reference numerals as in FIG. 1.

Moreover, as illustrated in these embodiments, the counterweights can be employed in a variety of locations relative to the float. See, for example, the four top views illustrated in FIGS. 5–8. In each embodiment, the flapper valve pivots about an axis 9.

These figures also illustrate another feature of the present invention: the adjustable attachment of the counterweight and/or the float onto the arm means. This can be accomplished by a variety of means. For example, the rod means 10 upon which either the counterweight 7 and/or the float 8 is located may be positioned at different distances from the plate or disc 3.

Figure 8:
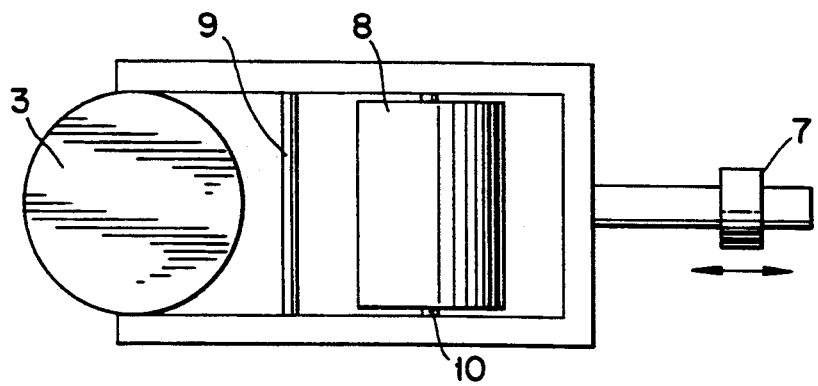

FIG. 8 illustrates another embodiment in which the counterweight is attached in such a manner that the position of the counterweight may be adjusted in order to vary the force associated therewith. In yet another embodiment, the relative positions of the counterweight and the float may be reversed from that illustrated in FIG. 8 so that the location of the float can be adjusted in the manner shown in FIG. 8. Because the weight of the float also effectively adds to the counterweight, this embodiment allows both the buoyancy and the counterweight to be varied by adjusting the distance between the float and the flapper.

As discussed above, the flapper valve according to the present invention can be effectively employed under situations where both submerged and non-submerged operations are required. Furthermore, it is clear that the flapper valve can be employed in those circumstances where during start up the system acts as a non-submerged operation and only after start up does the system become a submerged operation. This provides a distinct advantage over traditional flapper valves.

It will be apparent to those skilled in the art that the specific embodiments discussed above can be successfully repeated with components equivalent to those generically or specifically set forth above.

Accordingly, while the invention is described in terms of various preferred embodiments, the artisan will appreciate that various modifications, substitutions, omissions and changes may be made without departing from the spirit thereof. For these reasons, it is intended that the scope of the present invention be defined solely by the scope of the following claims including equivalents thereof.

I claim:

1. A flapper valve comprising:
   (a) a flapper means which is capable of closing an exit of a dipleg or a standpipe,
   (b) a counterweight means,
   (c) a float means,
   (d) arm means for connecting the flapper means with the counterweight means and the float means, and
   (e) support means for attaching the arm means to a dipleg or standpipe, wherein the float means has sufficient buoyancy so as to overcome the weight of the counterweight when the valve is submerged in a fluidized bed of particulate material.

2. The flapper valve according to claim 1 wherein the float comprises a gas-filled sphere or a gas-filled cylinder.

3. The flapper valve according to claim 1 wherein the counterweight is adjustably connected to the arm means.

4. The flapper valve according to claim 1 wherein the float is adjustably connected to the arm means.

5. A flapper valve comprising:
 (a) a flapper means which is capable of closing an exit of a dipleg or a standpipe,
 (b) a counterweight means,
 (c) a float means comprising a gas filled sphere or gas filled cylinder, wherein the float means has sufficient buoyancy so as to overcome the weight of the counterweight when the valve is submerged in a fluidized bed of particulate material;
 (d) arm means for connecting the flapper means with the counterweight means and the float means,
 (e) support means for attaching the arm means to a dipleg or stand pipe, and further wherein either the float means and/or the counterweight means is adjustably connected to the arm means.

6. An apparatus comprising a vessel, a dipleg having an exit, and a dipleg check valve means wherein the dipleg check valve means comprises a flapper means which is capable of closing the exit of the dipleg, a counterweight means, a float means, means for connecting the flapper means with the counterweight means and the float means, and support means for attaching the means for connecting with the dipleg, wherein the float means has sufficient buoyancy to overcome the weight of the counterweight when the check valve is submerged in a fluidized bed of particulate material.

7. The apparatus according to claim 6 further comprising a separator which is connected to the dipleg.

8. The apparatus according to claim 7 further comprising a riser reactor which is connected to the separator.

9. The apparatus according to claim 7 wherein the separator is a cyclone separator.

10. The apparatus according to claim 6 wherein the means for connecting is an arm means which is attached to the flapper, the counterweight and the float.

11. The apparatus according to claim 10 wherein the counterweight is adjustably connected to the arm means.

12. The apparatus according to claim 10 wherein the float is adjustably connected to the arm means.

13. The apparatus according to claim 6 wherein the float is a gas-filled sphere or a gas-filled cylinder.

14. An apparatus comprising a vessel, a riser reactor having at least an upper end located in the vessel, and at least one cyclone separator including a dipleg having an exit and a dipleg check valve means located in the vessel;
 wherein the dipleg check valve means comprises a flapper means which is capable of closing the exit of the dipleg, a counterweight means, a float means comprising a gas filled sphere or a gas filled cylinder wherein the float means has sufficient buoyancy to overcome the weight of the counterweight when the check valve is submerged in a fluidized bed of particulate material, and arm means connecting the flapper means with the counterweight means and the float means, wherein either the float means and/or the counterweight means is adjustably connected to the arm means.

15. The apparatus according to claim 14 wherein each of the at least one cyclone separators is a riser separator, a primary cyclone or a secondary cyclone.

* * * * *